United States Patent [19]

Kuan

[11] Patent Number: 4,617,212
[45] Date of Patent: Oct. 14, 1986

[54] BUSHING

[75] Inventor: Tiong H. Kuan, Hudson, Ohio

[73] Assignee: GenCorp Inc., Akron, Ohio

[21] Appl. No.: 707,331

[22] Filed: Mar. 1, 1985

[51] Int. Cl.$^4$ ............................ C08K 3/04; C08L 7/00;
C08L 9/00; F16F 1/38
[52] U.S. Cl. .................................. 428/36; 267/141.2;
428/376; 428/379; 428/372; 428/390; 428/398;
524/571
[58] Field of Search ...................... 524/571; 525/332.5,
525/332.6; 267/141.2; 428/36, 376, 379, 390,
398, 372

[56] References Cited

U.S. PATENT DOCUMENTS

Re. 29,821 10/1978 Aron .................................. 524/322
4,010,129 3/1977 Aron .................................. 524/322
4,383,074 5/1983 Kuan .................................. 524/469

FOREIGN PATENT DOCUMENTS 1051193 12/1966 United Kingdom ............ 525/332.6

OTHER PUBLICATIONS

Hofmann, "Vulcanization and Vulcanizing Agents", 1965, pp. 15-17, 77-78, 151-153 & 355-356.
Smith, Paper G, NRPRA, 3rd Rubber in Engineering Conference, 1973, pp. G/1 to G/9.

Primary Examiner—Allan M. Lieberman

[57] ABSTRACT

A low rate resilient bushing suitable for automobiles and other vehicles is disclosed where in the bushing, the carbon black reinforced rubber compound has been conventionally sulfur cured using an activator system of zinc oxide and certain soluble fatty acid materials.

7 Claims, 4 Drawing Figures

4,617,212

BUSHING

This invention relates to improved bushings or silent-blocs for vehicles such as automobiles and trucks.

An object of this invention is to provide a bushing exhibiting improved fatigue life.

Figure 2:
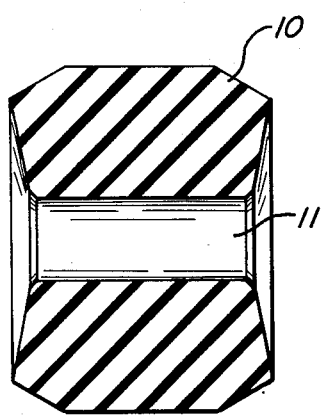
Figure 1:
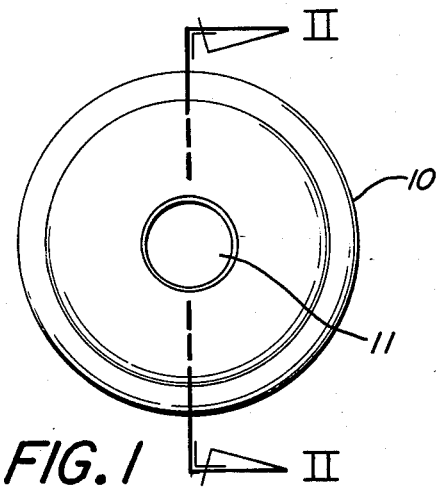
Figure 4:
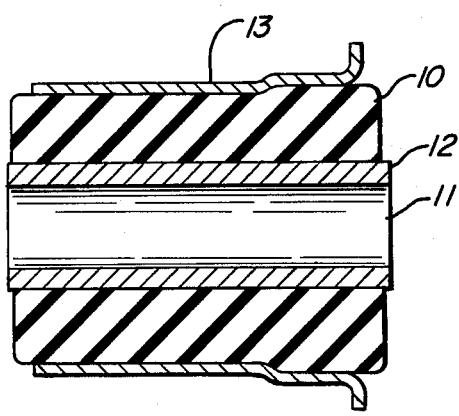
Figure 3:
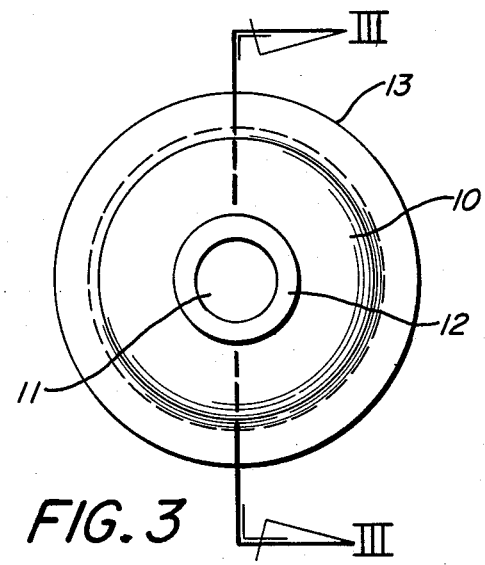

These and other objects and advantages of the present invention will become more apparent to those skilled in the art from the following detailed description, examples and accompanying drawing wherein FIG. 1 is a vertical end view of a rubber composition insert for use in making a bushing of this invention, FIG. 2 is a vertical cross section of the rubber composition insert of FIG. 1 taken along line II—II of FIG. 1, FIG. 3 is a vertical end view of an assembled bushing of the present invention and FIG. 4 is a vertical cross section of the bushing of FIG. 3 taken along line III—III of FIG. 3.

In the drawing, FIGS. 1 to 4, 10 is vulcanized annular rubber insert defining centrally disposed cylindrical hole 11 for insertion of substantially rigid cylindrical inner member or sleeve 12 usually of steel. The outer substantially rigid member or sleeve is indicated at 13 and likewise is usually of steel. During assembly the rubber insert 10 is compressed between inner member 12 and outer member 13 to form the completed bushing as shown in FIGS. 3 and 4.

SUMMARY OF THE INVENTION

According to the present invention a low rate resilient bushing exhibiting improved fatigue life has an annular molded carbon black reinforced conventionally sulfur vulcanized rubber compound insert in compressed relation between a substantially rigid cylindrical inner member or sleeve and a substantially rigid cylindrical outer member or sleeve where the rubber compound has been vulcanized with an activator system comprising zinc oxide and at least one soluble fatty acid material selected from the group consisting of zinc di(2-ethyl hexanoate), isostearic acid, oleic acid and a zinc-aluminum soap of tall oil fatty acid and where the rubber of said compound is selected from the group consisting of natural rubber and high cis-polyisoprene rubber and mixtures of the same.

The constant of proportionality which relates stress and strain of a bushing is defined as the dynamic spring rate. From a load-deformation standpoint, a softer bushing (one with a low spring rate) is expected to fail faster on fatigue than a harder bushing of a similar composition, when tested at equal load condition.

In addition to meeting a specified spring rate, it is also desirable that the bushing have good vibration damping properties and a long fatigue life. Fatigue life refers to the ability to withstand a large number of rotary oscillations without failure. The fatigue life of the bushing of the present invention is improved without significantly affecting spring rate or damping.

The trend is toward bushings having a lower dynamic spring rate for the front ends of smaller cars, e.g., a softer bushing, and a softer bushing is expected to fail faster. However, according to the present invention, while the spring rate may be slightly lower, the fatigue life is greater. In other words the present invention permits the production of low rate resilient bushings having improved fatigue life with minimal change in dynamic spring rate.

DISCUSSION OF DETAILS AND PREFERRED EMBODIMENTS

The present invention permits low rate bushings of significantly improved fatigue life to be made. Prior to this, lowering the dynamic spring rate (K) of a bushing usually led to a reduction in fatigue life (N). This behavior is a consequence of the condition of fatigue testing, namely constant force. Under this condition, a lower rate bushing deforms more and thus is less resistant to fatigue than a higher rate bushing. Usually adjusting the dynamic properties of bushings has been done mainly by changing the relative proportions of carbon black, oil, accelerator and sulfur levels. A different approach is required to make bushings with high fatigue life at low K.

The present invention centers on the cure activation system. Sulfur vulcanization of rubber requires activation for efficient and optimal crosslinking to occur. Efficiency refers to the degree of conversion of crosslinking precursors to elastically effective crosslinks. It affects the degree of crosslinking and the nature of the final network. A good cure system would lead to a high degree of crosslinking with a network which is relatively low in unreacted, dangling species and wasted crosslinks. All these contribute to the final vulcanizate properties, particularly strength.

The combination of stearic acid and zinc oxide is the most widely used activator for curing rubber. Stearic acid solubilizes zinc oxide by forming zinc stearate on mixing. Increased solubility facilitates the chelation of the organic accelerator(s) by the activator to initiate the crosslinking process. Without an activator, crosslinking reaction occurs slowly. This is due partly to the relatively strong S—S bond of the accelerating species. The use of an activator permits the energy for S—S bond breakage to be reduced by about 50% (W. Hofmann, "Vulcanization and Vulcanizing Agents," 1965, pages 151-153, see also pages 15-17, 77-78 and 355-356, Palmerton Pub. Co., Inc., New York), thus increasing the rate of crosslinking.

One problem with zinc stearate which is well-known in the rubber industry is its limited solubility in rubber. It will bloom to the rubber surface on aging at ambient temperature. When this happens, the distribution of crosslinks is expected to vary non-uniformily within the rubber vulcanizate. Some regions will be crosslinked more than others. On deformation, these highly crosslinked regions will act as stress concentrators where failure can be initiated.

In 1973, J. F. Smith of The Natural Rubber Producers Research Association (Paper G. NRPRA 3rd Rubber in Engineering Conference, 1973, pages G/1 to G/9) reported the advantages of 2-ethyl hexanoic acid when used in EV cure systems in natural rubber. This acid is more soluble than stearic acid. Vulcanizates prepared with this activator exhibited reduced creep and stress relaxation as compared to other cured rubber compounds. The improvements were attributed to the formation of a more homogeneous network in the presence of the soluble activators.

In the present invention certain soluble acids or esters (soaps or salts) as disclosed above are used in conjunction with zinc oxide to provide an activator system in a conventional sulfur cure system to make a low rate resilient bushing having improved fatigue life with minimal change in dynamic spring rate.

In the EV (efficient vulcanization) curing system the sulfur is generally used in an amount of less than 1 phr, and the accelerator(s) is/are used in an amount by weight greater than the amount of sulfur to provide substantially C—S—C crosslinks. In the conventional curing system the sulfur is generally used in an amount greater than about 2 phr, usually about 2.5 phr or more, and the accelerator is used in an amount much less than that of the sulfur to provide C—$S_x$—C crosslinks. See Hofmann and Smith, supra.

The other components of the rubber composition or compound of the insert for the bushing besides the zinc oxide and certain soluble fatty acid materials as set forth above comprise the usual compounding ingredients such as accelerators, oil, antioxidants, reinforcing carbon black(s), sulfur or sulfur donor materials and so forth. The reinforcing high abrasion, high structure furnace carbon blacks are preferred. Mixtures of reinforcing carbon blacks can be used; see, in particular, U.S. Pat. No. 4,383,074. Specific examples of some other materials are N-tert-butyl-2-benzothiazole sulfenamide, N-cyclohexyl-2-benzothiazole sulfenamide, tetramethyl or ethyl thiuram disulfide, benzothiazole disulfide, antioxidants (like N-1,3 dimethylbutyl, N',-phenyl-p-phenylene diamine), and rubber extending or processing mineral or petroleum oils. Other conventional rubber compounding ingredients can be present such as clays, silica, inhibitors, retarders, antidegradants and so forth. They may be blended or mixed together on a 2-roll rubber mill, in a Banbury and the like and then compression or injection molded and cured to make the round or angular hollow inserts. The rubber compound is cured or vulcanized using conventional temperatures and times. Likewise, known equipment can be utilized to force the cured annular hollow rubber inserts in compressed relation between a rigid or substantially rigid cylindrical inner metal member or sleeve and a rigid or substantially rigid outer metal member or sleeve to form the bushing. While steel is the preferred metal to use for the inner and outer members of the bushing, other metals, alloys and the like such as those of nickel, titanium, aluminum and so forth may be used where appropriate.

For bushings, the rubber employed is natural rubber or synthetic rubbery high cis-polyisoprene or mixture thereof, natural rubber being preferred. Cis-polyisoprene means a polyisoprene having from about 92 to 98% cis units.

Moreover, while the bushings of the present invention are directed to use in automobiles, it should be apparent that these bushings will have utility in suspension systems and the like of other types of vehicles such as trailers, trucks, recreational vehicles, and so forth.

The following examples will serve to illustrate the present invention with more particularity to those skilled in the art. In the examples parts are parts by weight unless otherwise noted.

EXAMPLE I

The compounds which are formulated to give low rate bushings are shown below.

| Low Rate Bushing Compounds | | |
|---|---|---|
| Ingredients | Compound A | Compound B |
| | Parts By Weight | |
| SMR-5 | 100 | 100 |
| S-315 | 34 | — |
| N-339 | — | 34 |
| PARA FLUX 2016 | 13 | 13 |
| ZnO | 5 | 5 |
| AGERITE SUPERFLEX | 1 | 1 |
| Retarder W | 0.2 | 0.2 |
| NOBS Special | 0.9 | 0.9 |
| TMTM | 0.2 | 0.2 |
| Sulfur | 2.75 | 2.75 |
| Fatty Acid/Ester (Salt or Soap) | Variable Type & Level | |

The compounds were molded and cured or vulcanized in molds at 315° F. for from about 15 to 18 minutes to make the hollow rubbery inserts. The cured inserts were combined under compression with substantially rigid inner and outer cylindrical steel sleeves to form assembled bushings of the general type as shown in FIGS. 1 to 4 of the accompanying drawing. The bushings were then tested for dynamic properties. The results are shown in Table I, below:

TABLE I

| | | Bushing Properties | | | | | |
|---|---|---|---|---|---|---|---|
| | | Compound 12 | | | Compound B | | |
| Fatty Acid/ Ester | Level | $K^{(1)}$ kN/m | $C^{(2)}$ kN·s/m | $N^{(3)}$ kc | $K^{(1)}$ kN/m | $C^{(2)}$ kN·s/m | $N^{(3)}$ kc |
| Stearic Acid (Control) | 2 | 2410 | 1.49 | 82.5 | 2778 | 2.58 | 229 |
| Isostearic Acid # | 2 | 2270 | 1.87 | 118.5 | 2510 | 2.29 | 310 |
| MANOMET 10# | 3 | 2190 | 1.22 | 119 | 2415 | 2.29 | 233 |
| MANOSEC Zn-22# # Soluble | 2.5 | 2220 | 1.58 | 124.5 | 2310 | 2.20 | 306 |

(1)Dynamic Spring Rate # (K*), kN/m
(2)Damping Coefficient # (C), kN-sec/m
(3)Fatigue Life** (N) kc to failure
MTS-Gilmore load frame: 136.2 kg preload; 20 Hz; ±0.015 cm radial deflection
**Clevite machine: 545.5 kg radial load; ±22° torsion; 4.2 Hz Of the activators evaluated, three (isostearic acid, MANOMET 10 and MANOSEC Zn 22) affected the bushing properties (K, C and N) in a most significant and positive way. C refers to the damping coefficient. It is another dynamic property which increases with increasing K based on existing methods of compound change.

The results indicated that all three soluble activators provided bushings with K values lower (6–17%) than that provided by the control. Despite their somewhat lower K values (spring rate), these bushings had significantly better fatigue life (N).

For K* and C determination, the bushings were mounted in the Gilmore load frame. Sinusoidal excitation of bushings was controlled by the MTS machine.

K* is obtained directly from the force-displacement diagram generated. C is calculated from the measured phase angle, δ, according to the equation:

$$C = \frac{K^* \tan\delta}{2\pi f}$$

where f is the frequency of excitation, in cps or Hz units.

For fatigue life measurement, the bushings were loaded in a Clevite fatigue testing machine. The required radial load was applied at the inner metal while torsional excitation was through the outer metal. Failure or fatigue life is the number of cycles or time spent in causing the loaded portion of the rubber insert to rupture, thus causing the outer and inner metal members to come in direct contact (catastrophic failure or tearing of the rubber).

EXAMPLE II

If all of the bushings were normalized to the same K, the difference in N values between the soluble activators and the control would be magnified even more. This is indeed reflected in the results shown in Table II, below. Bushings described in Table II were made according to the method of Example I, above, to have K values within about 4% of the control. This was done by adjustment of the black and oil levels in compound B of Example I, above.

TABLE II
Bushing Properties - Effect of Activator, Oil and Black

| Fatty Acid/ Ester | N-339 (phr) | PARAFLUX 2016 (phr) | K kN/m | C kN·s/m | N kc |
|---|---|---|---|---|---|
| Stearic Acid (control) | 34 | 13 | 2778 | 2.58 | 229 |
| Isostearic Acid | 34 | 8 | 2667 | 2.35 | 344 |
|  | 40 | 13 | 2880 | 3.21 | 485 |
| MANOMET 10 | 40 | 13 | 2883 | 3.08 | 360 |

As shown above, the fatigue life of bushings containing isostearic acid and MANOMET 10 averages between 50–112% higher than that of the control when the comparison was made at approximately equal K. Through the combined changes in activator type, black and oil levels, the C values of bushings containing the soluble activators are 20–30% higher than those based on the control. The only exception is isostearic acid with 34 phr of black and 8 phr or oil. The bushing prepared this way is, however, 4% lower in K than the control.

It is seen that the replacement of stearic acid by some soluble activators has led to low rate bushings with significantly higher fatigue life. In some cases, the method also led to significantly higher damping coefficient. Examples of soluble activators which provided these unusual characteristics to bushings include isostearic acid, MANOMET 10 and MANOSEC Zn 22 as shown in the above examples.

Prior to this discovery, a reduction in the bushing rate almost always was accompanied by a reduction in both fatigue life and damping coefficient.

EXAMPLE III

Additional bushings were prepared according to the method of Example I, supra. The ingredients of the compositions used in the bushing are shown in the Table III, below:

TABLE III

| Ingredients | Compound Weights (Grams) | | |
|---|---|---|---|
| Masterbatch | F | G | H |
| Masterbatch Bushing Insert | | | |
| SMR5 | 100 | 100 | 100 |
| N-339 | 34 | 34 | 34 |
| ZnO | 5 | 5 | 4.4 |
| Stearic Acid (Control) | 2 | 0 | 0 |
| Isostearic Acid | 0 | 3 | 0 |
| OCTOATE Z | 0 | 0 | 2.6 |
| PARA FLUX 2016 | 13 | 13 | 13 |
| AGERITE SUPERFLEX | 1.0 | 1.0 | 1.0 |
| Total Weights | 155.0 | 156.0 | 155.0 |
| Bushing Insert | | | |
| Masterbatch (from above) | 155 | 156 | 155 |
| Sulfur | 2.75 | 2.75 | 2.75 |
| TMTM | 0.2 | 0.2 | 0.2 |
| NOBS Special | 0.9 | 0.9 | 0.9 |
| Total Weights | 158.85 | 159.85 | 158.85 |

Tests were conducted as shown below:

TABLE IV
Tests On Above Uncured Compounds

| | | F | G | H |
|---|---|---|---|---|
| Mooney Viscosity (ML 1 + 4 at 212° F.) | Initial (at start) | 75 | 67 | 74 |
| | After 1½ minutes | 63 | 61 | 68 |
| | After 4 minutes | 58 | 57 | 64 |
| Monsanto Oscillating Disk Rheometer, | Min. Torque | 6.2 | 6.1 | 7.0 |
| | Max. Torque | 32.1 | 31.1 | 31.0 |
| | Time for Torque to 90% of max, mins. | 7.25 | 7.25 | 7.5 |
| | Time for Torque 2" rise #, mins. | 4.75 | 5.0 | 5.25 |
| | Time for Torque 5" rise #, mins. | 5.5 | 5.75 | 5.75 |
| # From min. torque | | | | |

TABLE V
Tensile Tests On Above Compounds When Cured

| | F | G | H |
|---|---|---|---|
| Tensile Strength, PSI | 3214(1475) | 3547(1132) | 3713(1526) |
| Ultimate Elongation, % | 522(240) | 579(200) | 615(239) |
| 10% Modulus, PSI | 70.2(80.1) | 58.6(77.7) | 54.8(90.7) |
| 100% Modulus, PSI | 310(479) | 288(459) | 270(503) |
| 300% Modulus, PSI | 1309(0) | 1223(0) | 1159(0) |
| Shore A Durometer Hardness | 62(68) | 60(68) | 60(68) |
| (Aged Properties 48 hrs. @ 212° F.) | | | |
| Compression Set, 22 hrs. @ 158° F. | 49.8 | 50.0 | 51.0 |

TABLE VI
Dynamic Properties Of Assembled Bushings Containing Cured Bushing Inserts Compressed Between Inner And Outer Cylindrical Substantially Rigid Steel Sleeves
(3 Separate Tests And Averages)

| | F | G | H |
|---|---|---|---|
| K(kN/m) | 2889 | 2697 | 2503 |
| | 2942 | 2697 | 2521 |
| | 2854 | 2697 | 2556 |
| | (Av. 2895) | (Av. 2697) | (Av. 2526.7) |
| C(kN·s/m) | 2.91 | 2.80 | 2.66 |
| | 2.89 | 2.64 | 2.66 |
| | 2.78 | 2.71 | 2.71 |
| | (Av. 2.86) | (Av. 2.72) | (Av. 2.68) |
| N(kc) | 132.0 | 163.5 | 205.5 |
| | 157.5 | 310.0 | 301.5 |
| | 157.5 | 205.5 | 264.0 |
| | (Av. 147.0) | (Av. 226.5) | (Av. 257.0) |

EXAMPLE IV

Additional bushings were prepared according to the methods of the above examples utilizing pelargonic, lauric and oleic acids. The formulation for the rubber inserts and the dynamic properties of the resulting bushings are shown in the following tables:

TABLE VII

| Ingredients Of Bushing Inserts | Parts By Weight | | |
|---|---|---|---|
| | I | J | K |
| SMR-5 | 100.0 | 100.0 | 100.0 |
| S-35 | 34.0 | 34.0 | 34.0 |
| Zinc Oxide | 5.0 | 5.0 | 5.0 |
| Pelargonic acid | 1.1 | — | — |
| Lauric acid | — | 1.4 | — |
| Oleic acid | — | — | 2.0 |
| PARA FLUX 2016 | 13.0 | 13.0 | 13.0 |
| Retarder W | 0.2 | 0.2 | 0.2 |
| AGERITE SUPERFLEX | 1.0 | 1.0 | 1.0 |
| Sulfur | 2.75 | 2.75 | 2.75 |
| TMTM | 0.2 | 0.2 | 0.2 |
| NOBS Special | 0.9 | 0.9 | 0.9 |
| Totals | 158.15 | 158.45 | 159.05 |

TABLE VIII

| Dynamic Properties Of Assembled Bushing | | | |
|---|---|---|---|
| | I | J | K |
| Spring Rate, K(kN/m) | 2614 | 2552 | 2388 |
| Damping Coefficient, C(kN · sec/m) | 1.54 | 1.67 | 1.56 |
| Fatigue Life, N(kc) | 62.25 | 71.25 | 86.25 |

Thus, this example demonstrates that not all soluble acids are effective in imparting the desired balance of properties.

EXAMPLE V

The method of this example was similar to that of the preceeding examples except that a different carbon black was used, and both the amounts of the black and oil were varied. The results obtained are shown in the tables below:

TABLE IX

| Ingredients of Bushing Inserts | L | M | N |
|---|---|---|---|
| SMR-5 | 100.0 | 100.0 | 100.0 |
| N-339 | 34.0 | 34.0 | 40.0 |
| Zinc Oxide | 5.0 | 5.0 | 5.0 |
| PARA FLUX 2016 | 13.0 | 8.0 | 13.0 |
| AGERITE SUPERFLEX | 1.0 | 1.0 | 1.0 |
| Oleic acid | 1.4 | 1.4 | 1.4 |
| Sulfur | 2.75 | 2.75 | 2.75 |
| TMTM | 0.2 | 0.2 | 0.2 |
| NOBS Special | 0.9 | 0.9 | 0.9 |
| Totals | 158.25 | 153.25 | 164.25 |

TABLE X

| Dynamic Properties Of Assembled Bushings | | | |
|---|---|---|---|
| | L | M | N |
| Spring Rate, K(kN/m) | 2265 | 2387 | 2965 |
| Damping Coefficient, C(kN · sec/m) | 2.23 | 2.27 | 3.04 |
| Fatigue Life, N(kc) | 227.5 | 301.5 | 196.5 |

Example V shows the desirability of using a high abrasion, high structure furnace carbon black with oleic acid in preparing a rubber insert for a bushing.

Notes for the Examples:
SMR-5: Standard Malaysian Rubber (grade 5).
S-315: ASTM S-315. High abrasion furnace carbon black, low structure and slow curing.
N-339: ASTM N-339. High abrasion, high structure furnace carbon black, improved.
PARA FLUX Petroleum hydrocarbon, Sp. gr. 1.0 to 1.02, dark
2016: viscous liquid, aromatic and asphaltic, flash point 235° F., viscosity SUS @ 210° F. of 74 to 94. The C.P. Hall Co.
AGERITE A diphenyl amine-acetone reaction product, an
SUPERFLEX: antioxidant, R. T. Vanderbilt, Co., Inc.
Retarder W: Salicylic acid to improve processability.
NOBS N—Oxydiethylene benzothiazole-2-sulfenamide.
Special: American Cyanamid, accelerator.
TMTM: tetramethyethiuram monosulfide, ultra accelerator.
MANOMET 10: Zinc-aluminum soap of tall oil fatty acid.
MANOSEC Zn 22: Zinc di(2-ethyl hexanoate).
OCTOATE Z: Liquid zinc di(2-ethylhexanoate) 80% active, R. T. Vanderbilt Co., Inc.
Isostearic EMERSOL 871. Titer, °C., Max. 10; iodine value-12
Acid: max; color % trans. 440/550, nm, min.-30/85; acid value-175 min.; sap value-180 min.; unsap % max.-6.0 by GLC analysis, AOCS Ce 1-62. Emery Industries Inc.
Oleic Acid: EMERSOL 210. Titer °C. 8-11; iodine value 89-93; color % trans 450/550 nm. min. 2/30; acid value 199-204; sap value 201-206; unsap % max. 1.5; typical 71% oleic acid, Emery Industries, Inc.
Lauric Acid: Harwick Chem. Corp., F-1295.

I claim:

1. A low rate resilient bushing exhibiting improved fatigue life and having an annular molded carbon black reinforced conventionally sulfur vulcanized rubber compound insert in compressed relation between a substantially rigid cylindrical inner member and a substantially rigid cylindrical outer member wherein said rubber compound has been vulcanized with an activator system comprising zinc oxide and at least one soluble fatty acid material selected from the group consisting of zinc di(2-ethyl hexanoate), isostearic acid, oleic acid and a zinc-aluminum soap of tall oil fatty acid,
   wherein the rubber of said compound is selected from the group consisting of natural rubber and high cis-polyisoprene rubber and mixtures of the same and
   wherein said soluble fatty acid material is used in an amount of from 1.4 to 3.0 parts by weight per 100 parts by weight of said rubber (phr).

2. A bushing according to claim 1 where said inner and said outer cylindrical members are of steel and where the rubber of said compound is natural rubber.

3. A bushing according to claim 2 where the fatty acid material is zinc di(2-ethyl hexanoate).

4. A bushing according to claim 2 where the fatty acid material is isostearic acid.

5. A bushing according to claim 2 where the fatty acid material is oleic acid.

6. A bushing according to claim 2 where the fatty acid material is a zinc-aluminum soap of tall oil fatty acid.

7. A bushing according to claim 2 where said carbon black is a high abrasion, high structure furnace carbon black.

* * * * *